US011914665B2

(12) United States Patent
Kapilevich et al.

(10) Patent No.: US 11,914,665 B2
(45) Date of Patent: Feb. 27, 2024

(54) MULTI-MODAL MACHINE-LEARNING MODEL TRAINING FOR SEARCH

(71) Applicant: Adobe Inc., San Jose, CA (US)

(72) Inventors: Matvey Kapilevich, New York, NY (US); Margarita R. Savova, Jersey City, NJ (US); Anup Bandigadi Rao, San Jose, CA (US); Tung Thanh Mai, San Jose, CA (US); Lakshmi Shivalingaiah, San Francisco, CA (US); Liron Goren Snai, Sunnyvale, CA (US); Charles Menguy, Brooklyn, NY (US); Vijeth Lomada, San Francisco, CA (US); Moumita Sinha, Cupertino, CA (US); Harleen Sahni, Washington, DC (US)

(73) Assignee: Adobe Inc., San Jose, CA (US)

( * ) Notice: Subject to any disclaimer, the term of this patent is extended or adjusted under 35 U.S.C. 154(b) by 273 days.

(21) Appl. No.: 17/675,290

(22) Filed: Feb. 18, 2022

(65) Prior Publication Data

US 2023/0267158 A1    Aug. 24, 2023

(51) Int. Cl.
  *G06F 16/248* (2019.01)
  *G06F 16/9538* (2019.01)
  *G06F 16/28* (2019.01)
  *G06F 16/901* (2019.01)
  *G06N 20/00* (2019.01)

(52) U.S. Cl.
  CPC ........ *G06F 16/9538* (2019.01); *G06F 16/248* (2019.01); *G06F 16/283* (2019.01); *G06F 16/9024* (2019.01); *G06N 20/00* (2019.01)

(58) Field of Classification Search
  CPC ..... G06F 16/248; G06F 16/435; G06F 16/635
  See application file for complete search history.

(56) References Cited

U.S. PATENT DOCUMENTS

| 10,373,197 B2 | 8/2019 | Jordan et al. |
| 2018/0260857 A1* | 9/2018 | Kar ................... G06Q 30/0254 |
| 2023/0297430 A1 | 9/2023 | Sinha et al. |

OTHER PUBLICATIONS

"Salesforce Marketing Cloud", Salesforce.com, inc. [retrieved Dec. 13, 2021]. retrieved from the Internet <https://www.salesforce.com/products/marketing-cloud/data-management/>, Oct. 2019, 9 Pages.

(Continued)

*Primary Examiner* — Robert W Beausoliel, Jr.
*Assistant Examiner* — Nirav K Khakhar
(74) *Attorney, Agent, or Firm* — FIG. 1 Patents

(57) ABSTRACT

Multi-modal machine-learning model training techniques for search are described that overcome conventional challenges and inefficiencies to support real time output, which is not possible in conventional training techniques. In one example, a search system is configured to support multi-modal machine-learning model training. This includes use of a preview mode and an expanded mode. In the preview mode, a preview segment is generated as part of real time training of a machine learning model. In the expanded mode, the preview segment is persisted as an expanded segment that is used to train and utilize an expanded machine-learning model as part of search.

20 Claims, 12 Drawing Sheets

(56) References Cited

OTHER PUBLICATIONS

Dewet, Stephanie, et al., "Finding Users Who Act Alike: Transfer Learning for Expanding Advertiser Audiences", KDD '19: Proceedings of the 25th ACM SIGKDD International Conference on Knowledge Discovery & Data Mining [retrieved Feb. 7, 2022]. Retrieved from the Internet <https://doi.org/10.1145/3292500.3330714>., Jul. 25, 2019, 9 pages.

Liu, Haishan, et al., "Audience Expansion for Online Social Network Advertising", KDD '16: Proceedings of the 22nd ACM SIGKDD International Conference on Knowledge Discovery and Data Mining [retrieved Dec. 13, 2021]. Retrieved from the Internet <http://www.kdd.org/kdd2016/papers/files/adf0483-liuA.pdf>., Aug. 13, 2016, 10 Pages.

* cited by examiner

MULTI-MODAL MACHINE-LEARNING MODEL TRAINING FOR SEARCH

BACKGROUND

Service provider systems are configured to make a variety of digital services available to client devices over a network. An example of this is implementation of "the cloud" in which hardware and software resources of the service provider system are provided for access over a network to various entities to perform desired computational tasks. Examples of digital services include productivity services (e.g., to edit digital documents, digital presentations, and spreadsheets), content creation services (e.g., to create digital images, digital audio, digital video, and other digital media), social network services, content streaming and storage services, hosting services, and so forth.

To do so, a vast infrastructure of devices and software are used by the service provider system to implement these digital services. This infrastructure utilizes hardware such as servers, network connection devices, storage devices, firewalls, and so on to provide an executable service platform that employs virtual machines, load balancers, and other virtualized hardware to implement the digital services. As such, a wide range of hardware devices and software is utilized in real world scenarios to implement a vast range of digital services by service provider systems and client device that access those systems.

Conventional techniques used to manage operation of the service provider systems, however, are challenged by this variety. For example, techniques have been developed in which machine-learning models are trained as a classifier to generate probabilities that an event will or will not occur for a particular entity. This is used, for instance, to generate a likelihood that operation of a particular device will fail in a particular timeframe by training a machine-learning model using usage data that describes device operation. As a result, the machine-learning model is employed to gain insight into probabilities that events will occur before those events actually occur.

Conventional techniques used to train the machine-learning model, however, consume significant amounts of computational resources and training data, and as such are not performable in real time but rather take hours and even days to perform. Thus, use of these machine-learning models in conventional scenarios also involves a significant time commitment to define and train. Further, any changes typically involve retraining of the machine-learning model, e.g., for use with other entities, to address other types of event occurrences, and so forth. As such, conventional machine-learning model training techniques are inefficient, resource intensive, and hinder operation of computing devices that implement the training techniques.

SUMMARY

Multi-modal machine-learning model training techniques for search are described that overcome conventional challenges and inefficiencies to support real time output, which is not possible in conventional training techniques. As such, these techniques improve operation and accuracy of computing devices used to train machine-learning models (e.g., as classifiers) for use in search.

In one example, a search system is configured to support multi-modal machine-learning model training. This includes use of a preview mode and an expanded mode. In the preview mode, a preview segment is generated as part of real time training of a machine learning model. The preview segment, for instance, includes at least one additional entity over a base segment. In this way, the search system supports real time output for different segments, which is not possible in conventional techniques.

In the expanded mode, the preview segment is persisted as an expanded segment that is used to train an expanded machine-learning model as part of search. The expanded machine-learning model, for instance, is included as part of scheduled operation of the search system in order to increase accuracy over the preview machine-learning model. Thus, through use of multiple modes the search system supports both real time output and increased accuracy, and thus improves operation of computing devices that implement these techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
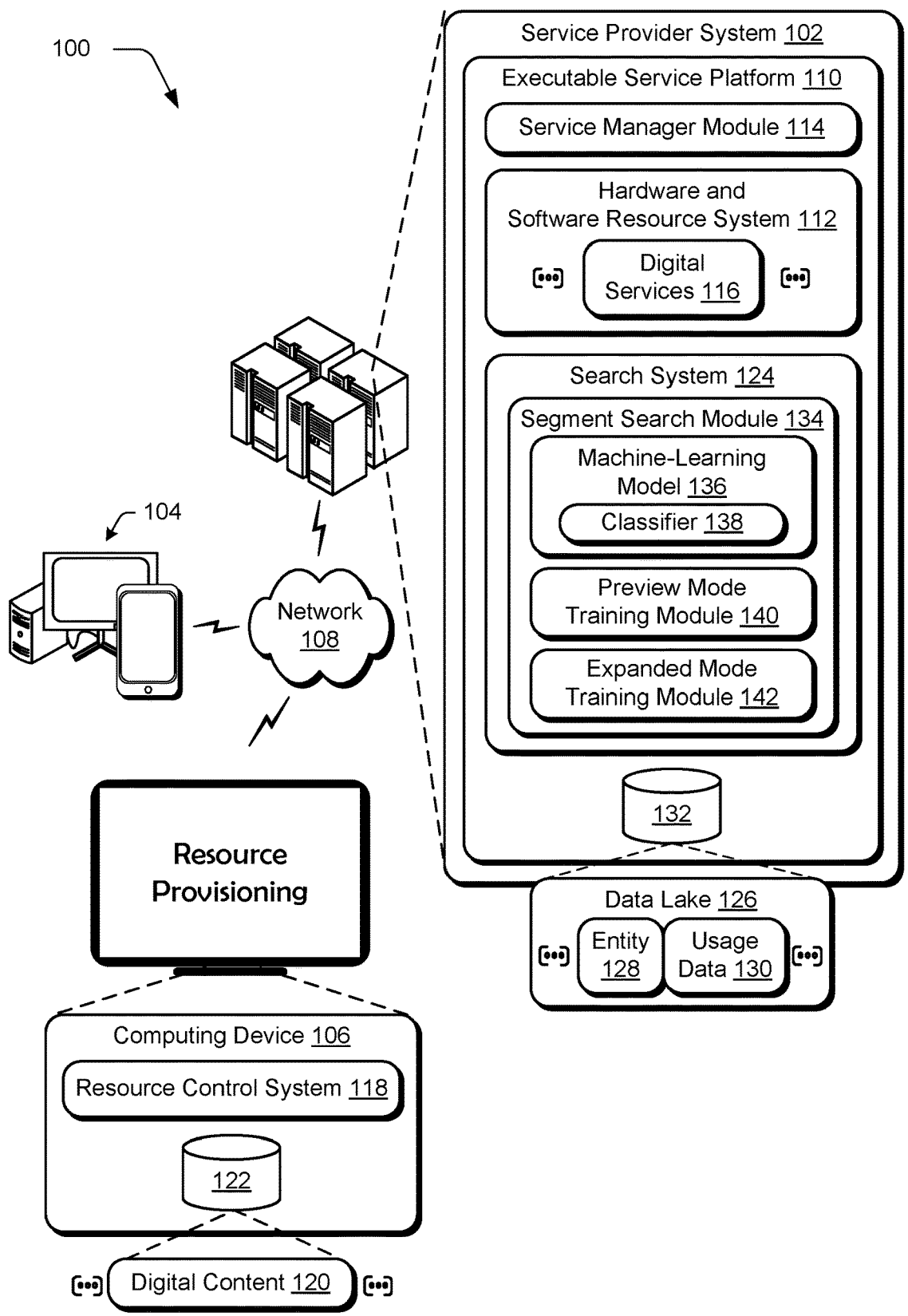
FIG. 1 is an illustration of a digital medium machine-learning model training environment in an example implementation that is operable to perform multi-modal machine-learning model training in support of search.

Conventional techniques used to train machine-learning models as classifiers consume significant amounts of computational resources, consume significant amounts of time to complete training, and so forth. As such, these limitations prevent use of the classifiers in time sensitive scenarios. This problem is compounded in scenarios that involve repeated development and refinement of the machine-learning models to achieve a desired result.

Consider an example in which an engineer is tasked with identifying a potential vulnerability in operation of network devices used by a service provider system, e.g., involving network access to the service provider system. The engineer identifies a segment of network devices that are expected to experience the vulnerability and trains a classifier as part of survival analysis to predict whether failure of the devices will or will not occur in a corresponding time period.

However, training of the machine-learning model in conventional techniques typically consumes hours and even days to perform. Once trained, the machine-learning model in this example is then used to search for devices that have a probability of failure before that failure actually occurs. An inability of the engineer to correctly identify this segment, however, in conventional techniques causes the engineer to start over and identify another segment, repeat the training, and then use the model. This causes inefficient consumption of network resources, use of vast quantities of data, and involves significant amounts of time to proceed through these iterations by the engineer and search system in order to achieve a desired result.

Accordingly, multi-modal machine-learning model training techniques for search are described that overcome conventional challenges and inefficiencies to support real time output, which is not possible in conventional training techniques. As such, these techniques improve operation and accuracy of computing devices used to train machine-learning models (e.g., as classifiers) for use in search.

In one example, a search system employs a machine-learning model configured as a classifier to determine probabilities of whether an event will or will not occur for a particular entity. The entity, for instance, corresponds to a hardware device and the event involves operation of the hardware device. This can be used for a wide range of search scenarios, such as locate data storage devices that are likely to reach capacity, network communications devices that experience less than a particular threshold amount of data, operational failure of a processor (e.g., as part of survival analysis), a software crash, and so forth.

Segments are used to specify a collection of entities (e.g., a subpopulation) that are to be a subject of the search for the occurrence of the event. The engineer, for instance, specifies a base segment of entities, e.g., by specifying particular entities individually, characteristics of the entities, and so forth. Characteristics, for instance, are usable to define the segment as entities configured as network managed switch hardware. The event is this example is whether the network managed switch hardware operates at less than five percent capacity, respectively, in order to identify potentially underutilized switches of the service provider system.

A machine-learning model is then trained using usage data that corresponds to these entities. The usage data is obtained from a data lake that is configured as a centralized collection of data describing operation of entities as part of the service provider system. The machine-learning model, once trained in this example, is configured to identify probabilities of the network managed switch hardware of experiencing less than five percent capacity within a defined period of time in the future, e.g., using subsequent usage data collected from the data lake.

The search system also includes functionality to expand upon this base segment, e.g., to locate additional entities that are likely to experience this occurrence. In conventional systems, this involved starting over to define a new segment, locate training data for that segment, and then train the machine-learning model which typically consumes hours and even days in real world scenarios. These limitations hinder operational efficiency in identifying these scenarios, inefficient use of computational resources in the training of the machine-learning model and limits an ability to make changes to the segment due to these delays.

In an example, the search system is configured to support multi-modal machine-learning model training. This includes use of a preview mode and an expanded mode. In the preview mode, a preview segment is generated as part of real time training of a machine-learning model. The preview segment, for instance, includes at least one additional entity over a base segment. In this way, the search system supports real time output for different segments, which is not possible in conventional techniques.

In the expanded mode, the preview segment is persisted as an expanded segment that is used to train and utilize an expanded machine-learning model as part of search. The expanded machine-learning model, for instance, is included as part of scheduled operation of the search system in order to increase accuracy over the preview machine-learning model. Thus, through use of multiple modes the search system supports both real time output and increased accuracy, and thus improves operation of computing devices that implement these techniques.

The search system, for instance, outputs an option in a user interface to initiate generation of a preview segment that is to include at least one entity not included in a base segment. In response, the search system obtains entity and corresponding usage data from a cache as base training data. The base training data is used to train a base machine-learning model as corresponding to the base segment, which is usable to predict probabilities of entities of having the event occurrence.

A base accuracy/reach graph is then generated as describing accuracy which indicates similarity of respective entities in the base segment (i.e., accuracy with respect to an underlying definition of membership criteria the base segment) and reach describing a corresponding number of the entities having that similarity, i.e., the reach. This training and output are performed in real time (e.g., less than ten seconds) through sampling data from the cache.

A user input is then received by the search system via interaction with the user interface to generate a preview segment by specifying reach and/or accuracy using the base accuracy/reach graph, e.g., as part of the preview mode. This input, for instance, is usable to expand on a number of entities included in the base segment (e.g., network managed switch hardware) to include additional entities, e.g., unmanaged network switches, smart switches, PoE switches, and so forth.

In response, the search system generates preview training data by sampling corresponding usage data from the cache for entities corresponding to the preview segment, e.g., that have the defined amount of accuracy and therefore are within a subpopulation defined by the reach. The preview training data is used to train a preview machine-learning model in real time and provide search results using the model, e.g., specifying probabilities of respective entities of experiencing the event based on subsequent usage data. In this way, use of the preview model is also available in real time for use as part of search, which is not possible in conventional techniques.

Continuing with the above example, the engineer then desires to "keep" the preview segment after use of the trained preview machine-learning model, e.g., based on scoring results generated for the preview machine-learning model indicating the search results are accurate. Accordingly, a user input is received to persist the preview model, e.g., selection of an expanded mode representation. This causes a preview segment to baseline segment mapping to be stored, storage of a segment definition of the preview segment, along with model results (e.g., influential factors, the preview accuracy/reach graph) from the trained preview machine-learning model.

Persistence of the preview segment causes formation of an expanded segment that is included as part of an expanded training mode that includes scheduled training and subsequent searches by the search system. The search system, for instance, receives an input as part of an expanded model selection to initiate scheduled training of the expanded segment. In response, the segment definition and model results are obtained from storage along with expanded training data from the cache. The expanded training data is used to train the expanded machine-learning model to increase accuracy over that of the preview machine-learning model. In this way, the multi-modal machine-learning model training techniques support both real time output and increased accuracy over time, which is not possible using conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Digital Medium Example Environment

FIG. 1 is an illustration of a digital medium machine-learning model training environment 100 in an example implementation that is operable to perform multi-modal machine-learning model training to support search, e.g., as a classifier. The illustrated environment 100 includes a service provider system 102, client devices 104, and a computing device 106 that are communicatively coupled, one to another, via a network 108. Computing devices that implement the service provider system 102, client devices 104, and computing device 106 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as described in FIG. 12.

The service provider system 102 includes an executable service platform 110 having a hardware and software resource system 112. The executable service platform 110 employs a service manager module 114 to manage implementation and access to digital services 116 "in the cloud" that are accessible by the client devices 104 via the network 108. Thus, the hardware and software resource system 112 provides an underlying infrastructure to support execution of digital services 116.

The executable service platform 110 supports numerous computational and technical advantages, including an ability of the service provider system 102 to readily scale resources to address consumption by the client devices 104. Thus, instead of incurring an expense of purchasing and maintaining proprietary computer equipment for performing certain computational tasks, cloud computing provides the client devices 104 with access to a wide range of hardware and software resources so long as the client devices 104 has access to the network 108.

The computing device 106, for instance, includes a resource control system 118 to control which digital services 116 are made available to the client devices 104, e.g., as a customer of the service provider system 102. Examples of digital services 116 include productivity services (e.g., to edit digital documents and spreadsheets), content creation services (e.g., to create digital images, digital audio, digital media), social network services, content streaming services, and so forth. Thus, the resource control system 118 in this example is configured to control which digital services 116 are accessible by the client devices 104 via the network 108. The resource control system 118, for instance, is usable to cause digital content 120 (illustrated as stored in a storage device 122) to be communicated (e.g., streamed) and made accessible to respective client devices 104 via the network 108 using the digital services 116.

As part of managing operation of the hardware and software resource system 112, the service provider system 102 includes a search system 124. The search system 124 is configured to search a data lake 126. The data lake 126 is implemented as a centralized repository of data describing operation of the executable service platform 110. As part of this, the data lake 126 maintains an association of entities 128 and usage data 130 corresponding to those entities, e.g., in one or more storage devices 132.

The entities 128 are configurable to describe a variety of different aspects of operation of the executable service platform 110. The entities 128, in one example, correspond to hardware devices utilized to implement the hardware and software resource system 112, such as processors, memory devices, network communication devices, hardware firewalls, input/output devices, cooling devices, and so forth. The entities 128 also refer to software resources executed by the executable service platform 110, e.g., virtual servers, containers, applications, digital content 120, and so forth. The entities 128 are further configurable to describe access to the digital services 116, e.g., by referencing user accounts of the service provider system 102, individual client devices 104, and so on.

Thus, the data lake 126 includes a vast amount of data describing a variety of aspects of operation of the executable service platform 110. Because of this, however, search techniques used to search data from the data lake 126 that is to serve as a basis to manage operation of the executable service platform 110 is confronted with and often confounded by this vast amount of data. To address this, the search system 124 includes a segment search module 134 that is usable to interact with portions of this data defined using segments and train a machine-learning model 136 to predict a likelihood (i.e., probability) of event occurrence for those entities. The events, for instance, are configurable to describe aspects of hardware device operation described above, access to digital content 120, and other functionality made available via the digital services 116.

In the illustrated example, the machine-learning model 136 is implemented as a classifier 138. Classifiers are configured to assign probabilities of membership in a class, for which, the machine-learning model 136 is trained, e.g., using supervised or unsupervised learning. For a classifier 138 employed in a spam filtering example, the classifier is configured to assign a probability that an email "is" or "is not" spam. In another example, the classifier is trained using digital images to determine whether a digital image includes or does not include a particular digital object. Thus, the classifier 138, when used in conjunction with a segment, is utilized to determine probabilities of respective entities 128 in the segment of encountering an event. As such, correct definition of the segment has a direct effect on accuracy of achieving a desired result because the segment defines the subpopulation of entities defined in the data lake 126 that are used to train the model. Use of segments helps to address the vast amount of data included in the data lake 126. For example, the data lake 126 in some real-world scenarios includes Petabytes of data that describes billions of entities and corresponding usage data. As such, use of segments to describe a subpopulation of entities in the data lake 126 is used to improve accuracy of machine-learning models 136 trained for that subpopulation to predict event occurrence for the subpopulation defined by the segment.

Conventional techniques used to train a machine-learning model 136, however, even when used for a particular segment of the entity population consume significant amounts of time, e.g., hours and even days in real-world scenarios. Therefore, these techniques are not available in scenarios involving short timeframes and are ponderous in scenarios involving refinement of a definition of the segment (i.e., to define entity membership in the segment) caused by repeated training of machine-learning models to achieve a desired result.

Accordingly, the segment search module 134 supports multiple-modal machine-learning model training, examples of which are illustrated as a preview mode training module 140 and an expanded mode training module 142. The preview mode training module 140 is configured to support a "fast path" to provide feedback for respective preview segments in real time. The expanded mode training module 142 is configured to support increased accuracy in training of the machine-learning model 136, such as through scheduled training that is performed "offline" and thus is not in real time. In this way, the segment search module 134 is configured to support real time feedback for prospective preview segments. Preview segments that are deemed desirable are persisted as expanded segments by the expanded mode training module 142 (e.g., as part of scheduled training) in order to improve accuracy.

The segment search module 134, for instance, is configured to support input of a base segment (i.e., a "seed" segment), and through use of the preview mode training module 140, identify entities that are not included in the base segment, but are similar to this segment. The supports an ability to expand a search to a larger subpopulation of the entities 128 in the data lake 126. In this way, the segment search module 134 support an ability to define and refine segments in real time and then improve accuracy of those segments over time, which is not possible in conventional techniques. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Multi-Modal Machine-Learning Model Training

The following discussion describes techniques that are implementable utilizing the previously described systems and devices to perform multi-modal machine-learning model training for search. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

Accuracy/Reach Graph Generation

Figure 2:
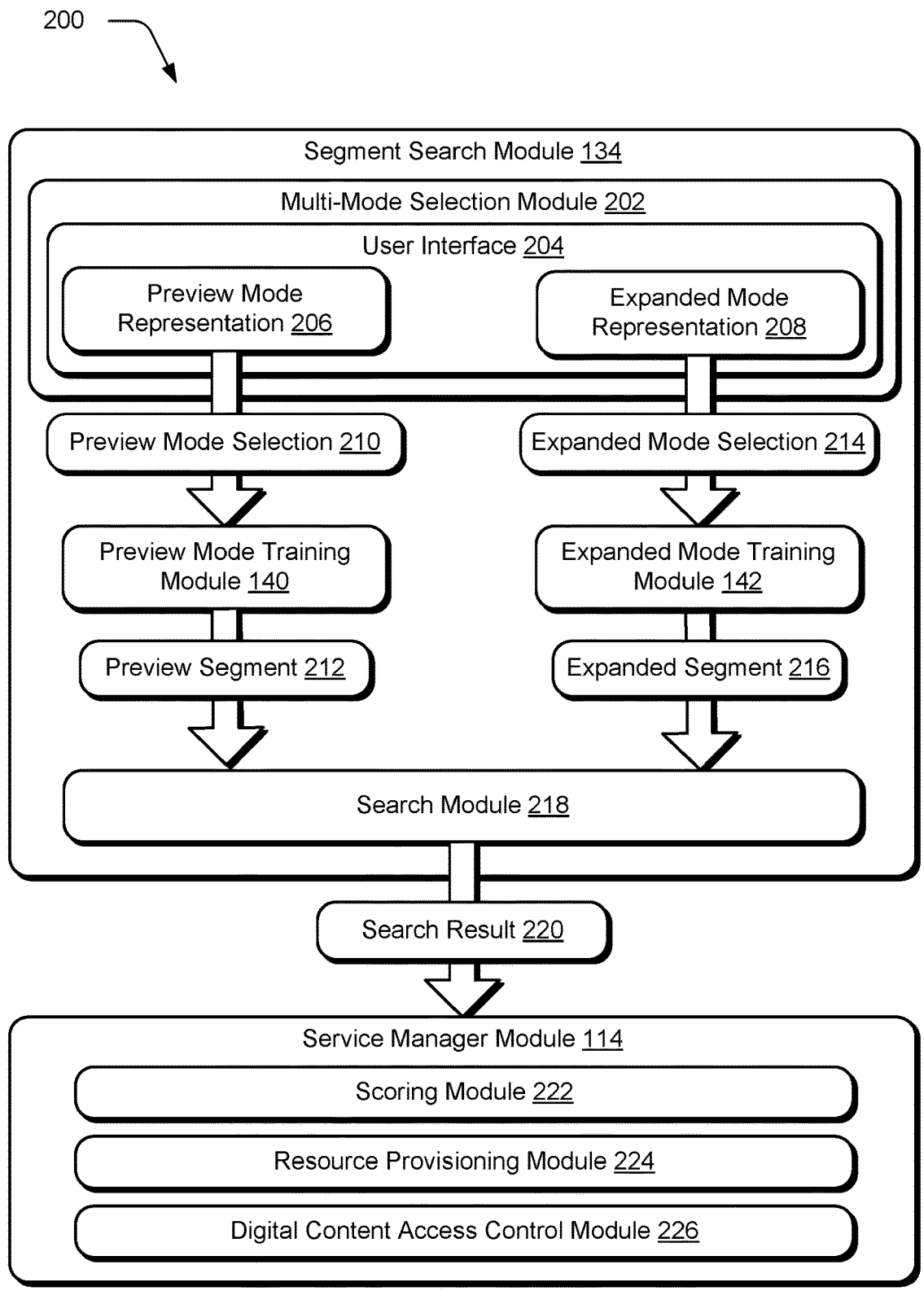
FIG. 2 depicts a system in an example implementation showing operation of a segment search module of FIG. 1 in greater detail.
Figure 3:
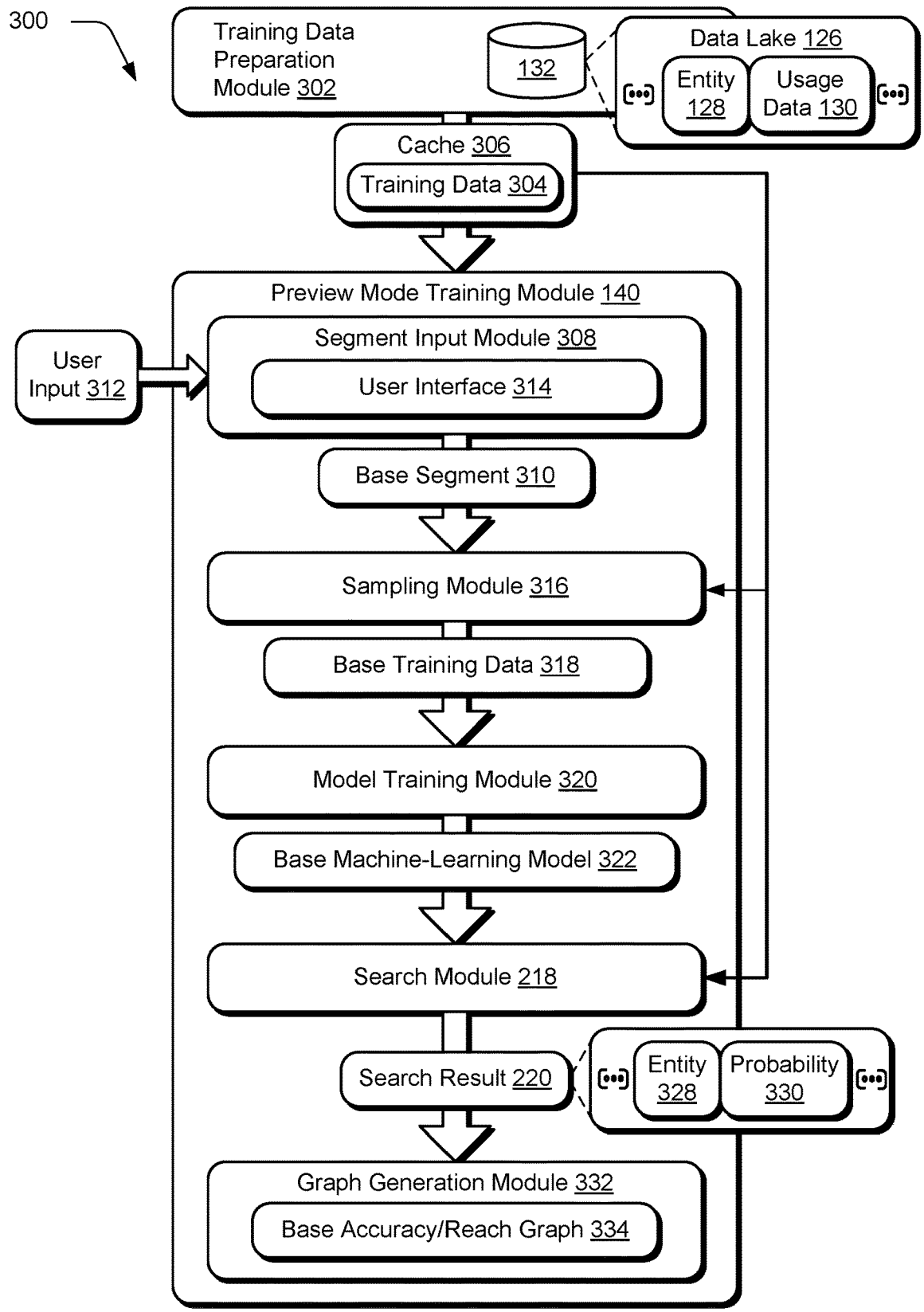
FIG. 3 depicts a system in an example implementation showing operation of a preview mode training module as generating a base accuracy/reach graph in real time for a base segment.
Figure 4:
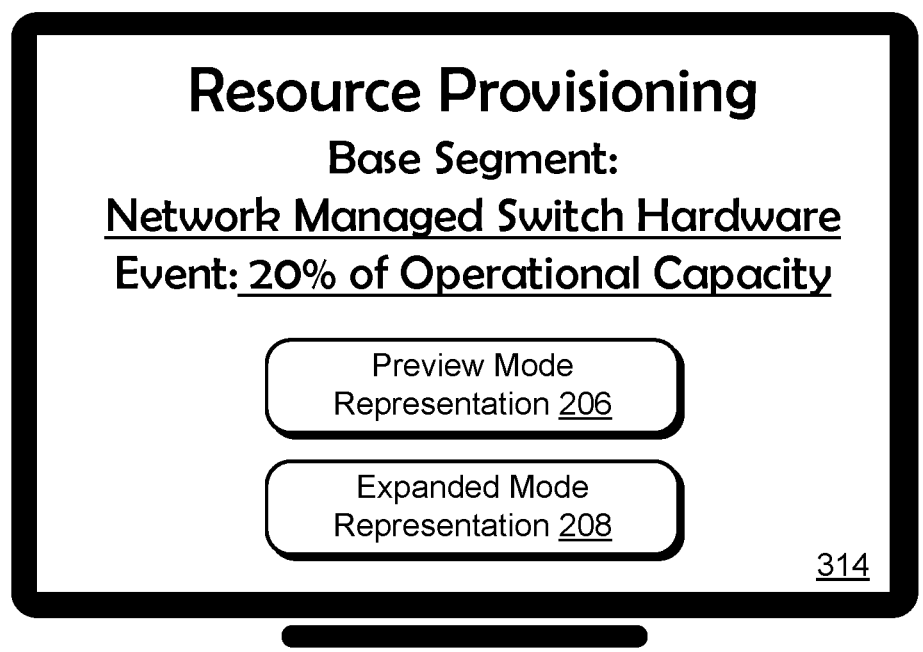
FIG. 4 depicts an example implementation of training mode selection using respective representations in a user interface.
Figure 5:
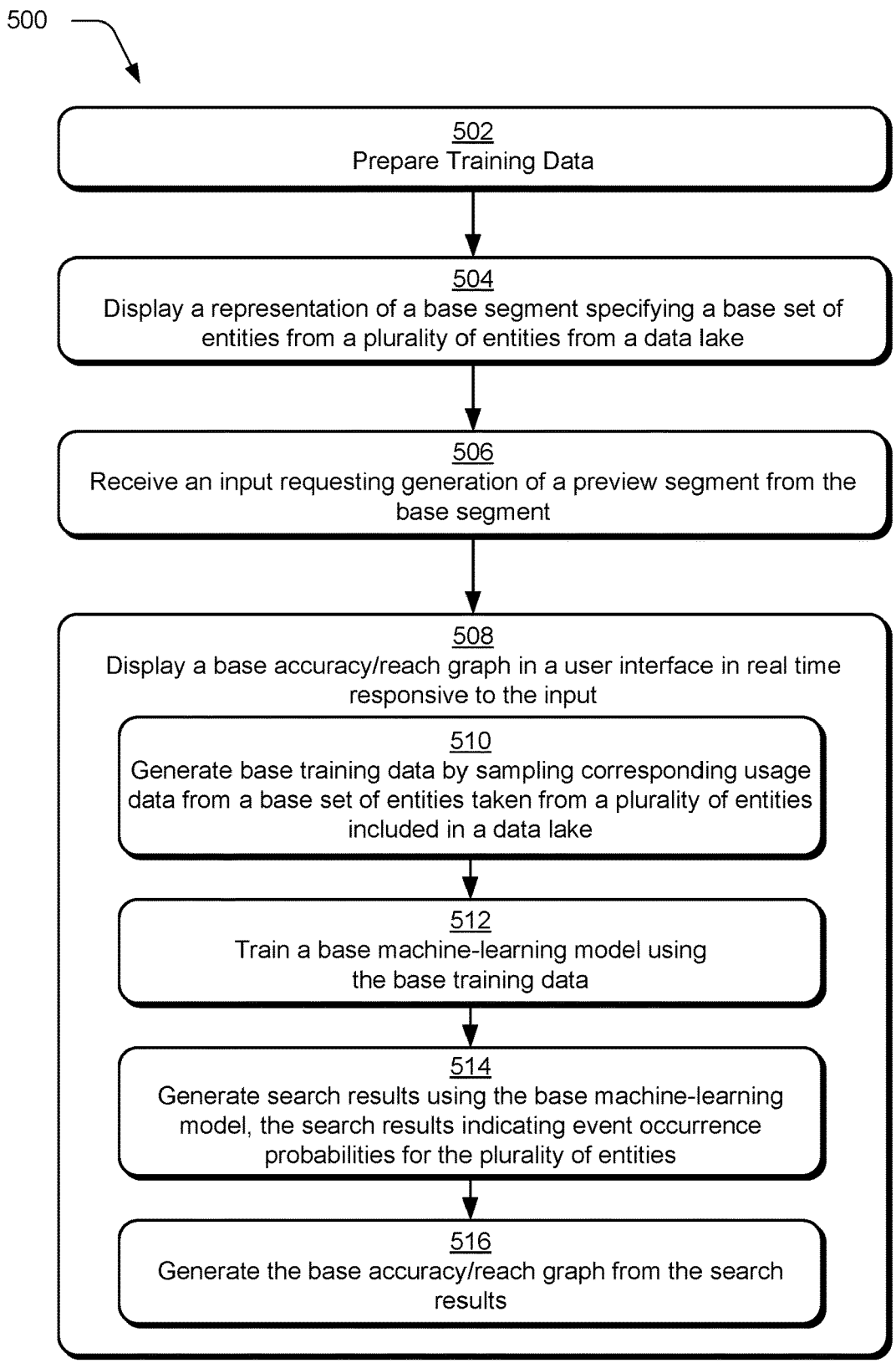
FIG. 5 is a flow diagram illustrating a procedure in an example implementation for display of a base accuracy/reach graph for a base machine/learning model trained in real time for a base segment.

FIG. 2 depicts a system 200 in an example implementation showing operations of the segment search module 134 of FIG. 1 in greater detail. FIG. 3 depicts a system 300 in an example implementation showing operation of a preview mode training module as generating a base accuracy/reach graph in real time for a base segment. FIG. 4 depicts an example implementation 400 of training mode selection using respective representations in a user interface. FIG. 5 depicts a procedure 500 in an example implementation of generating the base accuracy/reach graph for a base machine/learning model trained in real time for a base segment.

To begin in this example, a multi-mode selection module 202 of FIG. 2 outputs a user interface 204 that includes a preview mode representation 206 and an expanded mode representation 208. A resource control system 118, for instance, displays the user interface 204 received from the multi-mode selection module 202 that includes a listing of segments of a population of entities used to train machine-learning models to perform a search. The machine-learning models are configurable as a classifier to generate probabilities that the entity belongs to a particular class. The class in this example pertains to occurrence of an event and as such the probabilities define a likelihood that the event will or will not occur for a respective entity, e.g., within a defined timeframe. Other types of machine-learning models are also contemplated, e.g., neural networks, decision trees, statistical models, and so on.

As previously described, conventional techniques used to train classifiers and other types of machine-learning models consume significant amounts of computational resources. Further, challenges are encountered when subsequent changes are to be made to the model, e.g., to change a segment of a user population. Accordingly, the segment search module 134 supports multiple modes including a "fast path" and a "slow path" to support real time feedback and increased accuracy, respectively.

A user input, for instance, is received via interaction with the user interface 204 to select the preview mode representation 206. In response, the multi-mode selection module 202 generates a preview mode selection 210 to initiate operation of the preview mode training module 140. The preview mode training module 140 is configured to train a machine-learning model to generate a preview segment 212. In this way, the preview segment 212 is created and refinable in real time, which is not possible in conventional techniques.

In a situation in which the preview segment 212 operates as intended, the multi-mode selection module 202 includes an expanded mode representation 208 to initiate an expanded mode selection 214 to persist the preview segment 212. The expanded mode selection 214, for instance, is received by the expanded mode training module 142 to generate an expanded segment 216 based on the preview segment 212. This is performed using a segment definition, segment mapping, and weights corresponding to a machine-learning model trained to generate the preview segment 212. The expanded mode training module 142 is executable at scheduled intervals to train a corresponding machine-learning model (e.g., offline) to increase accuracy over that of a machine-learning model used to generate the preview segment 212.

The segment search module 134 also includes a search module 218 that is configured to generate a search result 220 using machine-learning models trained by the preview mode training module 140 and/or the expanded mode training module 142. A service manager module 114 is then employed to process the search result 220, e.g., as part of operation of the executable service platform 110 of the service provider system 102. Examples of this processing are represented as a scoring module 222 that is configured to score results for individual entities, e.g., for accuracy in the search result 220. The search result 220 is also usable by a resource provisioning module 224 to control operation of executable service platform 110 for hardware device operation (e.g., processors, memory devices, network connection devices), software entities (e.g., virtual servers, load balancers), and so forth. In another example, the search result 220 is used by a digital content access control module 226 to control output of digital content 120, e.g., access to, communication of, and so forth.

FIG. 3 depicts a system 300 in an example implementation showing operation of the preview mode training module 140 in greater detail as generating a base accuracy/reach graph in real time for a base segment. In this example, a training data preparation module 302 is configured to prepare training data 304 (block 502) from data included in the data lake 126, e.g., for inclusion in a cache. Preparation of the training data 304 includes formation as part of a structured query language (SQL) database, filtering to remove data that is not relevant to model training (e.g., redundant data, superfluous data that does not differentiate operation of one entity from another, and so on), and use of an indexer to index the data based on entity 128 in the cache 306. The user interface 314 is configured in some instances to perform this preparation offline for storage in the cache 306 to reduce an amount of time used subsequently to train machine-learning models and support real time results.

A segment input module 308 is then utilized to input a base segment 310. An engineer interacting with the resource control system 118 of the computing device 106, for instance, utilizes a collection of base segments as a basis for a variety of searches. A representation of a base segment is displayed in the user interface 314 in FIG. 4 (block 504) that is titled "Network Managed Switch Hardware." The user interface 314 also depicts a corresponding event of "20% of operational capacity." During this interaction, the engineer decides that it is desirable to expand a subpopulation of entities beyond that of the base segment and thus reconfigure how a corresponding search is performed by the model.

Options to do so are illustrated in the user interface 314. The user interface 314 as includes a preview mode representation 206 and an expanded mode representation 208. The preview mode representation 206, as described above, is operable to generate a preview segment in real time. This operates to provide feedback regarding a makeup of the preview segment that is generated using the base segment, e.g., consumes an amount of time less than a threshold amount such as ten seconds. The expanded mode representation 208, on the other hand, is configured to provide increased accuracy by training from a larger set of training data than is used to train the preview machine-learning model (e.g., as a scheduled "batch" job), and thus has increased accuracy.

Accordingly, in this example, a user input 312 is received that requests generation of a preview segment from the base segment 310 (block 506) by selecting the base segment 310 and the preview mode representation 206. In response, a base accuracy/reach graph is displayed by the segment search module 134 in the user interface in real time responsive to the input (block 508).

To do so, a sampling module 316 is employed to generate base training data 318 by sampling the training data 304 from the cache 306. The sampling, for instance, is performed to take subsets of the training data 304 corresponding to entities defined for the base segment 310 from a plurality of entities 128 included in the data lake 126 (block 510). Through use of the training data 304 from the cache 306, this processing is performable in real time.

The base training data 318 is then used by a model training module 320 to train a base machine-learning model 322 (block 512) in real time. When training the base machine-learning model 322 as a classifier, for instance, the base training data 318 is sampled from usage data 130 describing characteristics of operation of respective entities, e.g., the network managed switch hardware. As such, the base training data 318 describes whether events did or did not occur. The base training data 318 also describes the events and circumstances around the events that provide insight into what potentially caused and/or is an indicator of event occurrence for a respective entity 128.

The base machine-learning model 322, once trained, is then employed by the search module 218 to generate a search result 220. The search result 220 indicates event occurrence probabilities 330 for the plurality of entities 328 (block 514), respectively. The base machine-learning model 322, as previously described, when trained as a classifier is configured to determine probabilities of relating to a class. In these examples, the class pertains to occurrence of an event. Continuing with the above example, the event describes whether a corresponding network managed switch hardware will experience less than 20% of operational capacity in a given timeframe. The base machine-learning model 322, once trained using the training data 304, is then usable to process subsequent data from the cache 306 and/or usage data 130 for other entities outside of the base segment 310 to determine probabilities of event occurrence for those entities as defined within the search result 220.

In this example, the search results 220 are received as an input by a graph generation module 332. The graph generation module 332 is configured to generate a base accuracy/reach graph 334 from the search result 220 of the base machine-learning model 322 for the base segment 310 (block 516). In accuracy/reach graphs, accuracy describes similarity of respective entities to an entity definition of the base segment 310. The entity definition, for instance, defines characteristics to define which of the entities 128 are members of the base segment 310. Reach, on the other hand, represents a corresponding size of a subpopulation of entities that have that defined amount of similarity. Thus, the base accuracy/reach graph 334 describes similarity of other entities to entities in the base segment 310, e.g., based on results generated for the other entities by the base machine-learning model 322. As such, the base machine-learning model 322 supports a search for these other entities as involving occurrence of the event, which are usable to define a preview segment, an example of which is described as follows.

Preview Segment Generation

Figure 6:
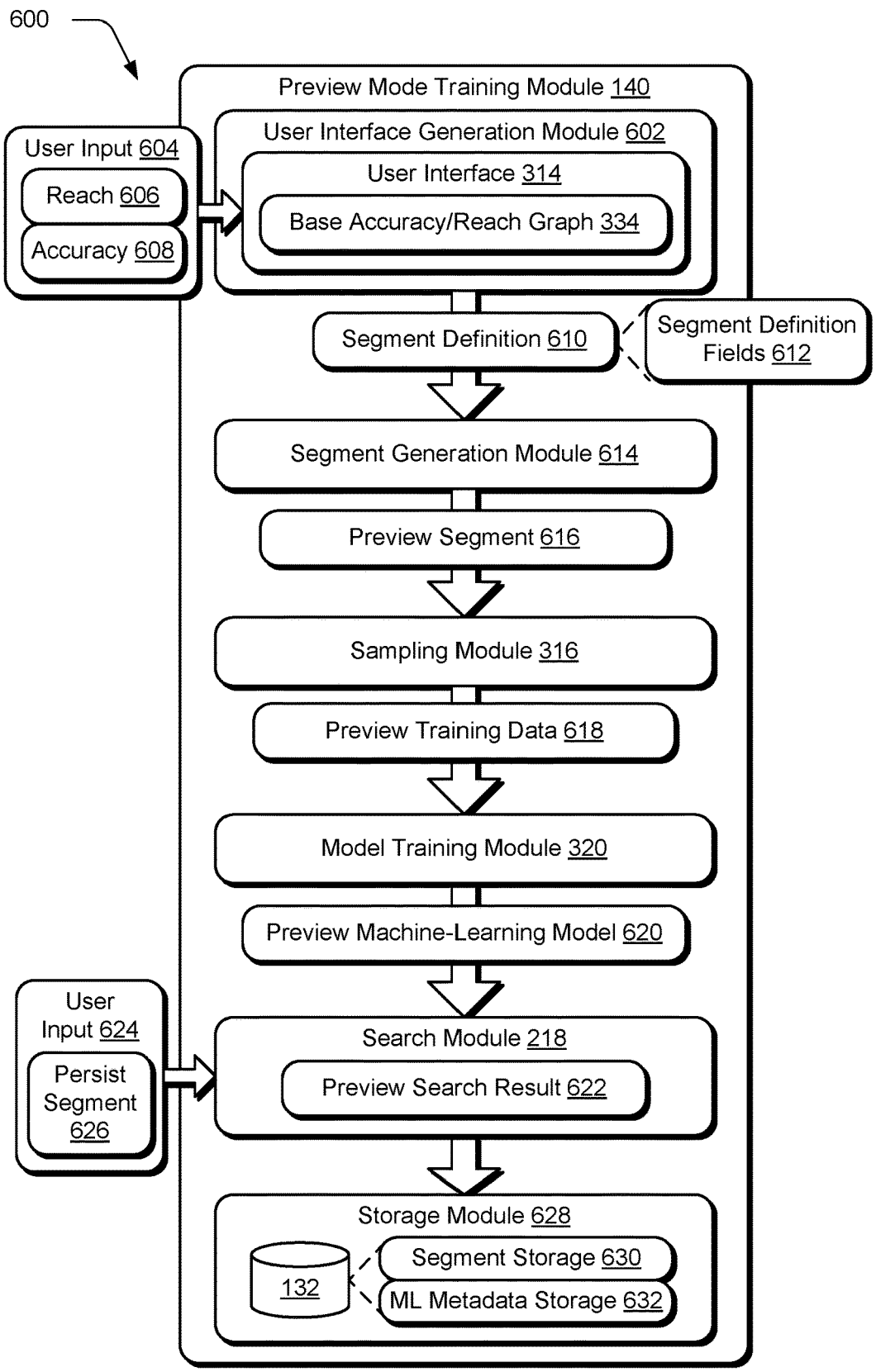
FIG. 6 depicts a system in an example implementation showing operation of a preview mode training module of FIG. 1 as generating a preview segment based on a user input received selecting an amount of accuracy or reach through interaction with the base accuracy/reach graph
Figure 7:
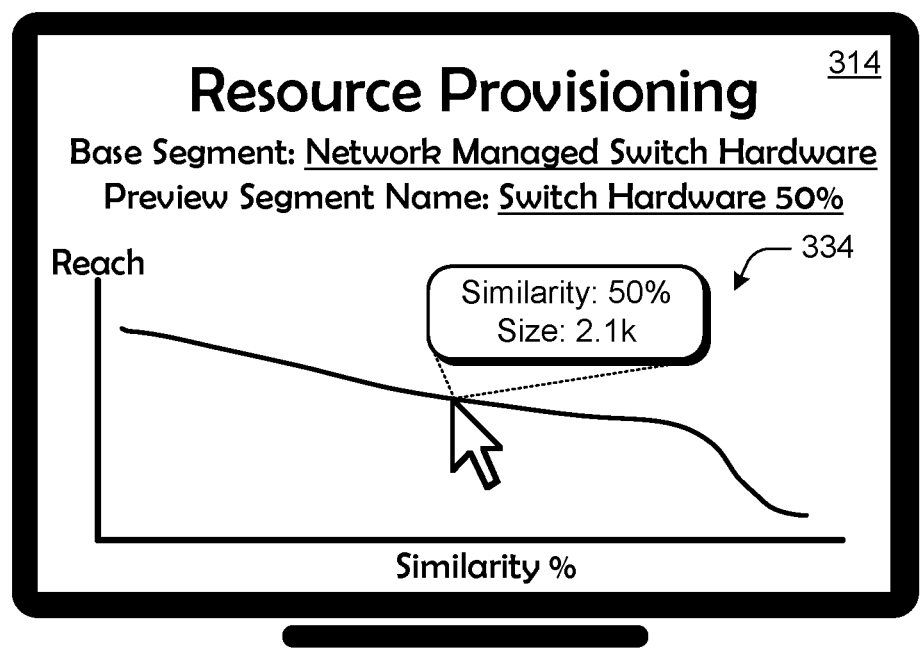
FIG. 7 depicts an example implementation showing output of the base accuracy/reach graph and receipt of a user input specifying the amount of accuracy or reach.
Figure 8:
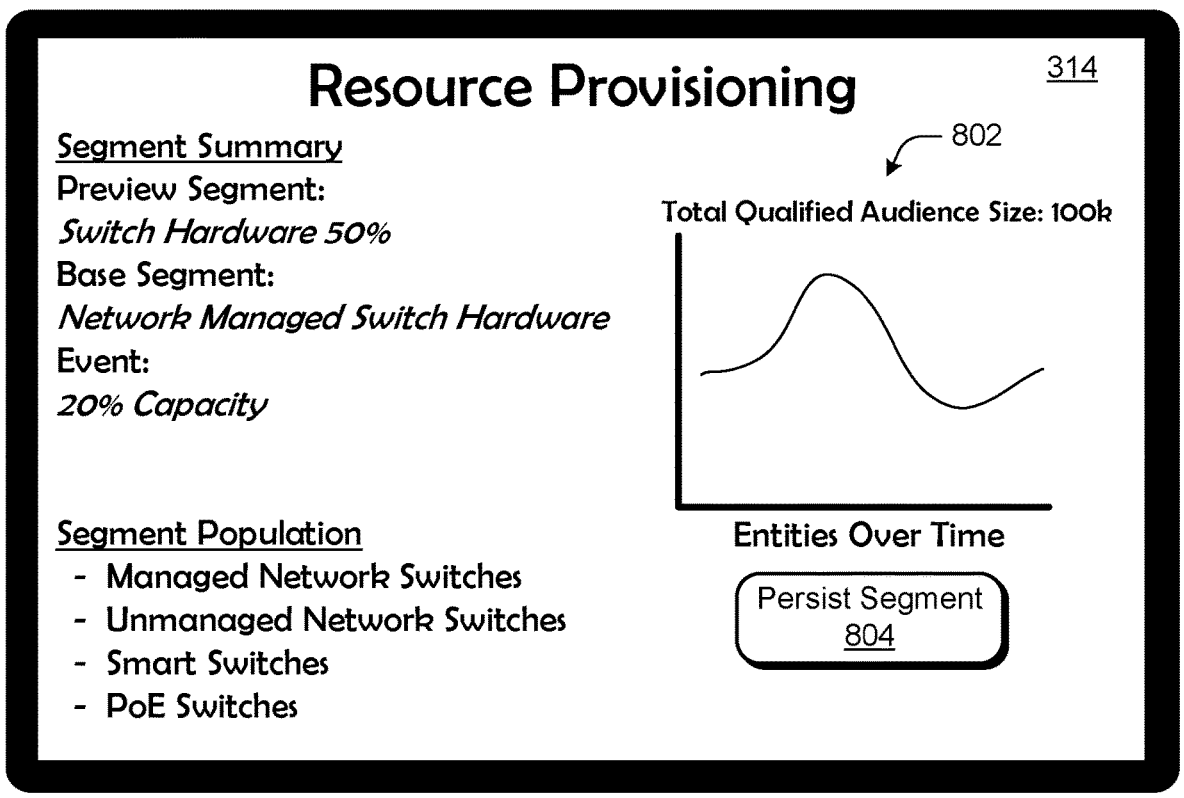
FIG. 8 depicts an example implementation of search results based on the preview segment and output of a representation selectable to persist the preview segment as an expanded segment.
Figure 9:
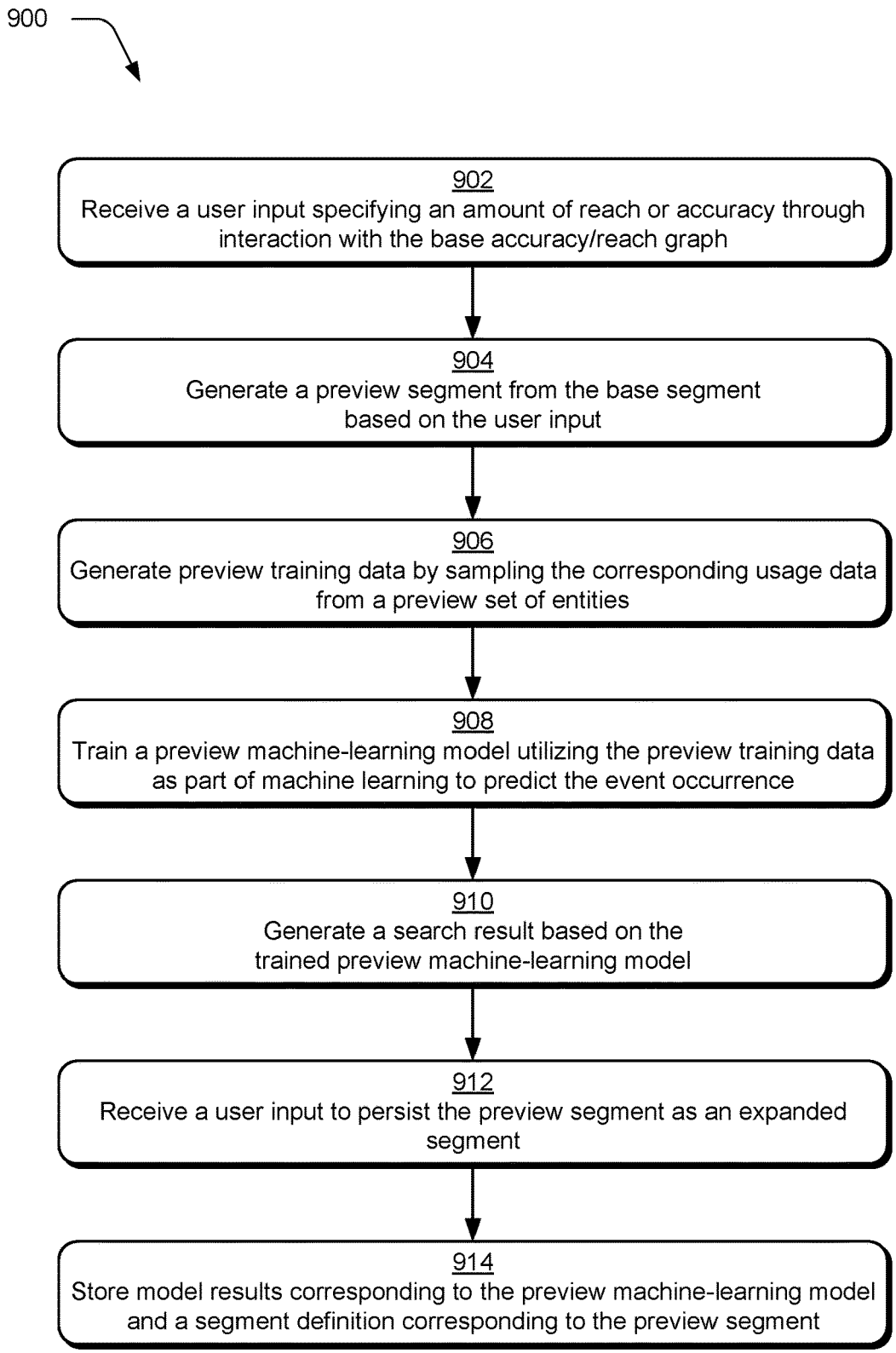
FIG. 9 is a flow diagram illustrating an example procedure involving preview segment generation, preview machine-learning model training, and use of the preview machine-learning model as part of search.

FIG. 6 depicts a system 600 in an example implementation showing operation of the preview mode training module 140 of FIG. 1 as generating a preview segment based on a user input received selecting an amount of accuracy or reach through interaction with the base accuracy/reach graph. FIG. 7 depicts an example implementation 700 showing output of the base accuracy/reach graph and receipt of a user input specifying the amount of accuracy or reach. FIG. 8 depicts an example implementation 800 of search results based on the preview segment and output of a representation selectable to persist the preview segment as an expanded segment. FIG. 9 depicts an example procedure 900 involving preview segment generation, preview machine-learning model training, and use of the preview machine-learning model as part of search.

To begin at FIG. 6, a user interface generation module 602 outputs a user interface 314 for display by a display device. The user interface 314 includes the base accuracy/reach graph 334 as described in the previous section. A user input 604 is received that specifies an amount of reach 606 or accuracy 608 through interaction with the base accuracy/reach graph 334 (block 902).

FIG. 7 depicts an example of the base accuracy/reach graph 334 as displayed in a user interface 314. The base accuracy/reach graph 334 includes a first axis defining respective amounts of reach and a second axis defining respective amounts of accuracy, i.e., "similarity." The user input 604 is depicted as being input via a cursor control device (e.g., mouse) as selecting a particular point along the base accuracy/reach graph 334. This causes output of a popup menu indicating respective amounts of accuracy (e.g., "similarity: 50%") and reach (e.g., "size: 2.1 k") of a subpopulation of the entities having that amount of similarity.

In response, a segment definition 610 is generated that includes segment definition fields 612 that define characteristics of the entities having the corresponding amount of similarity and/or are in the audience size having the corresponding reach as selected by the user input 604. This is used by a segment generation module 614 to generate a preview segment 616 from the base segment based on the user input (block 904). The preview segment 616 therefore defines a subpopulation of the entities 128 included in (i.e., are members of) the base segment 310 as well as at least one additional entity.

The preview segment 616 is usable in a variety of ways by the preview mode training module 140. In a first example, the preview segment 616 is used along a "fast path" in real time to generate a preview machine-learning model using similar techniques to that descried for the base machine-learning model. As such, training of the preview machine-learning model is performable in real time, e.g., to provide actionable insight into management of the executable service platform 110 based on additional entities included in the preview segment 616. In another example, the preview segment 616 is persisted as an extended segment by the segment search module 134 along a "slow path" to increase accuracy of the model, examples of which are described in the "Expanded Segment Generation" section below.

Continuing with the real time example above, the sampling module 316 generates preview training data 618 by sampling training data 304 from the cache 306 that corresponds to a preview set of entities (block 906) that are members of the preview segment 616. The model training module 320 then trains a preview machine-learning model 620 utilizing the preview training data 618 as part of machine learning to predict the event occurrence (block 908), e.g., as a classifier.

This causes the preview machine-learning model 620 to be trained using preview training data 618 that has an increased scope in comparison to the base training data 318 used to train the base machine-learning model 322. Accordingly, a preview search result 622 generated through use of the preview machine-learning model 620 by the search module 218 (block 910) is also based on additional entities specified using the preview segment 616.

FIG. 8 depicts an example implementation 800 of display of characteristics of preview search results 622 generated based on the preview segment 616 by the preview machine-learning model 620. The user interface 314 includes information describes the preview segment 616, such as a segment name "Switch Hardware 50%," identification of a base segment used to create the preview segment (e.g., "Network Managed Switch Hardware") and the corresponding event, e.g., "20% Capacity."

The user interface 314 also includes information identifying the preview set of entities that are members of the preview segment 616. This includes entities included in the original base segment 310, e.g., the "managed network switch hardware." Additional entities are also listed that are identified using the preview segment 616, e.g., "unmanaged network switches," "smart switches, and "PoE switches." The user interface 314 also includes a graph 802 showing changes in an audience size of entities that qualify for membership in the preview segment 616 over time. In this way, the engineer in this example is provided with the preview machine-learning model 620 which is usable in real time to evaluate definition of the preview segment 616.

If the preview segment 616 supports desired functionality and insights, an option 804 is provided in the user interface 314 that is user selectable to cause the preview segment 616 to be persisted (block 912) by the segment search module 134, e.g., as part of scheduled retraining to improve accuracy and in order to supported repeated use. In response to receipt of a user input 624 generated by selecting the option 804 to "persist segment" 626, a storage module 628 is employed to store a segment definition of the preview segment 616 in segment storage 630 and model results corresponding to the preview machine-learning model 620 in machine learning (ML) metadata storage 632 (block 914). This is then used by an expanded mode training module 142 for use of an expanded segment 216 based on the preview segment 212, an example of which is described in the following section.

Expanded Segment Generation

Figure 10:
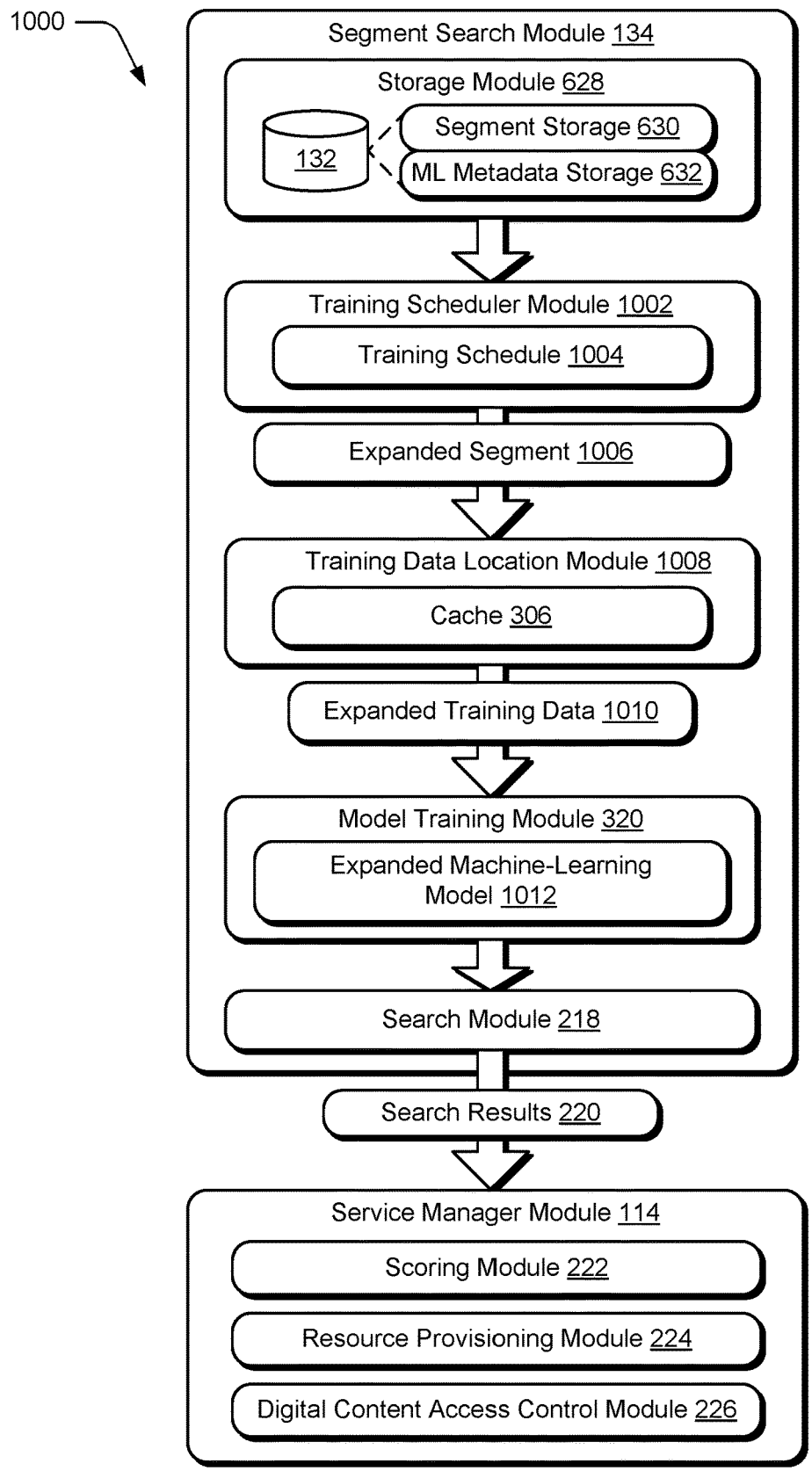
FIG. 10 depicts a system in an example implementation of persisting a preview segment as an extended segment as part of scheduled training of an extended machine-learning model based on a preview machine-learning model.
Figure 11:
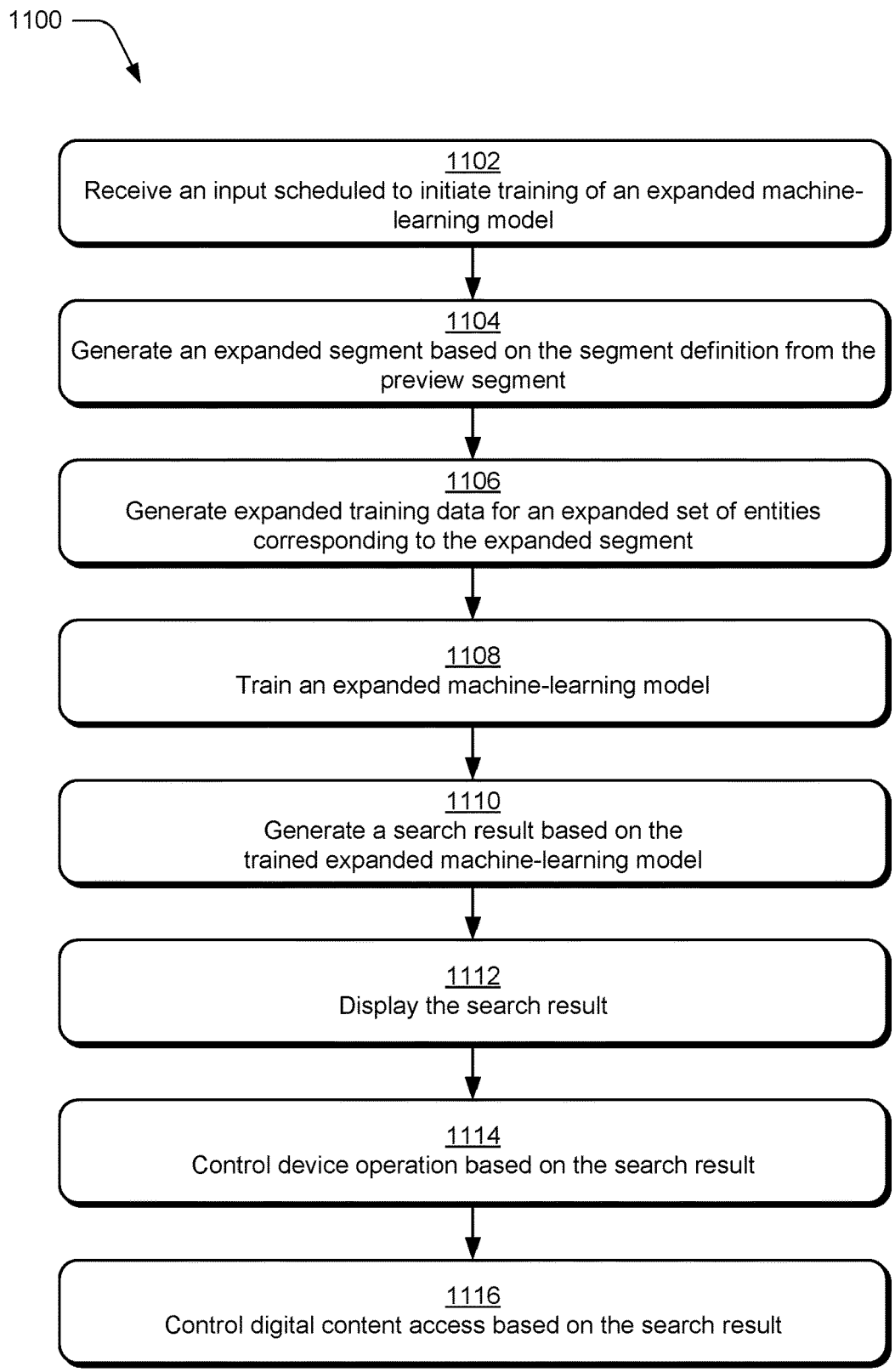
FIG. 11 is a flow diagram illustrating a procedure in an example implementation of scheduled training of the extended machine-learning model and control of operation of the service provider system based on the model.

FIG. 10 depicts a system 1000 in an example implementation of persisting a preview segment as an extended segment as part of scheduled training of an extended machine-learning model based on a preview machine-learning model. FIG. 11 depicts a procedure 1100 in an example implementation of scheduled training of the extended machine-learning model and control of operation of the service provider system based on the model.

In this example, the preview segment 616 is persisted in a storage module 628, e.g., as part of segment storage 630 and metadata storage 632. The preview segment 616 is included along with other segments of the segment search module 134 for scheduled batch training, which is used to increase accuracy of corresponding machine-learning models.

To do so, a training schedule module 1002 initiates training a machine-learning model (block 1102) based on a training schedule 1004. The schedule 1004, for instance, specifies training during off hours of resource consumption of the executable service platform 110, at particular points in time (e.g., daily, weekly), and so forth. In response, an expanded segment 1006 is generated (block 1104) based on a segment definition of the preview segment 616 maintained in segment storage 630 by the storage module 628.

A training data location module 1008 is then utilized to locate expanded training data 1010 for an expanded set of entities corresponding to the expanded segment 1006 (block 1106), e.g., from the cache 306. The expanded training data 1010, for instance, includes an amount of data that is greater than an amount of data included in the preview training data 618 to train the preview machine-learning model 620. The expanded training data 1010 is then used by the model training module 320 to train an expanded machine-learning model 1012 (block 1108), e.g., as a classifier. The expanded machine-learning model 1012 is used as previously described by a search module 218 to generate search results 220 (block 1110), which are displayed in a user interface (block 1112). This is usable as previously described by the service manager module 114, e.g., to control device operation (block 1114), control digital content access (block 1116), and so forth. As a result, the multi-modal machine-learning model training techniques discussed herein support both real time output and increased accuracy, which is not possible in conventional techniques.

Example System and Device

Figure 12:
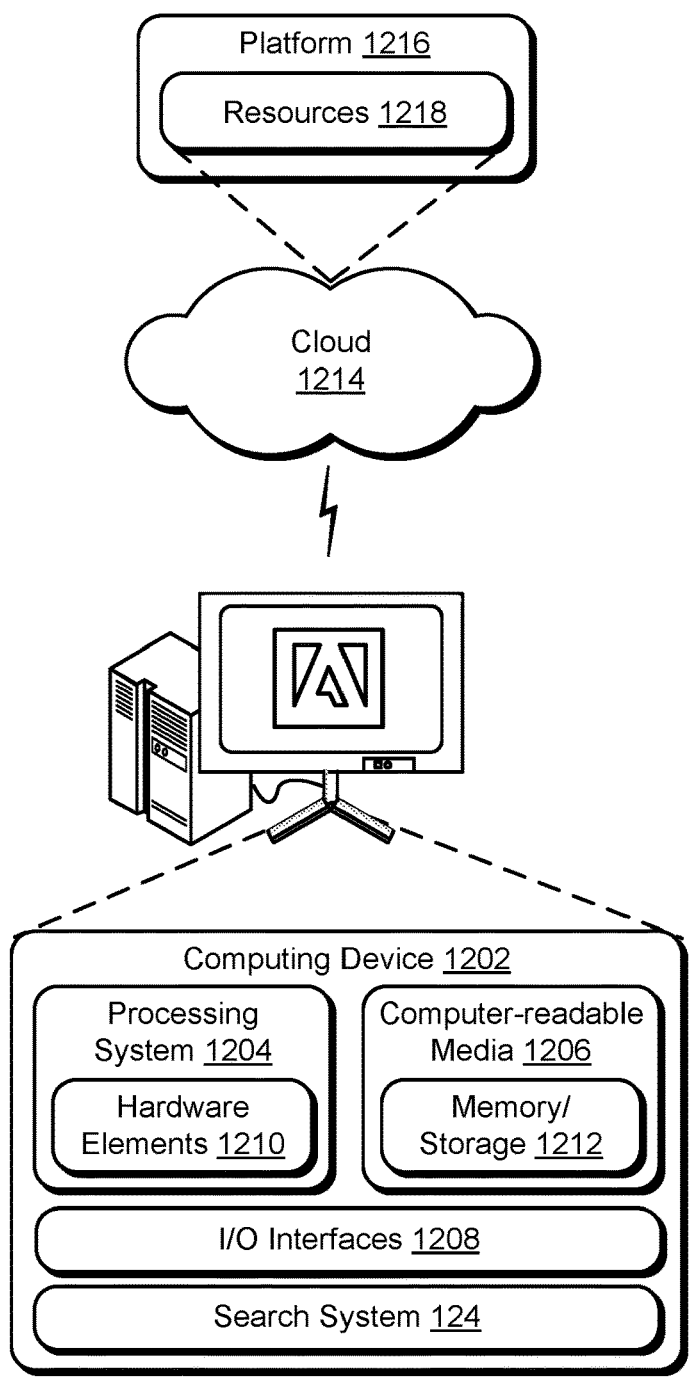
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the search system 124. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium machine-learning model training environment for search, a method implemented by a computing device, the method comprising:
    receiving, by the computing device, an input requesting generation of a preview segment from a base segment;
    displaying, by the computing device in real time responsive to the input, a base accuracy/reach graph in a user interface, the displaying including:

generating base training data by sampling corresponding usage data from a base set of entities, defined by the base segment, taken from a plurality of entities included in a data lake;

training a base machine-learning model using the base training data;

generating search results, using the base machine-learning model, indicating event occurrence probabilities for the plurality of entities; and generating the base accuracy/reach graph from the search results;

generating, by the computing device, the preview segment based on a user input specifying an amount of reach or accuracy via the base accuracy/reach graph; and controlling, by the computing device, digital service operation of as part of an executable service platform of a service provider system based on a preview machine-learning model trained for the preview segment.

2. The method as described in claim 1, wherein the entities are devices and the controlling the digital service operation includes controlling operation of the devices based on inclusion in the preview segment and respective probabilities of having the event occurrence as determined by the preview machine-learning model.

3. The method as described in claim 1, wherein the event occurrence involves device operation as part of the executable service platform of the service provider system.

4. The method as described in claim 1, wherein the controlling the digital service operation includes controlling access to digital content for the plurality of entities.

5. The method as described in claim 1, wherein the plurality of entities are specified as accounts implemented by the service provider system to access the digital services via a network.

6. The method as described in claim 1, wherein the displaying the base accuracy/reach graph in the user interface by the computing device in real time responsive to the input is performed within ten seconds of receiving the input.

7. The method as described in claim 1, wherein the preview segment includes at least one additional said entity that is not included in the base segment.

8. The method as described in claim 1, further comprising:

generating, by the computing device, preview training data by sampling corresponding usage data from a preview set of entities, defined by the preview segment, taken from the plurality of entities included in the data lake;

training, by the computing device, the preview machine-learning model using the base training data; and generating, by the computing device, search results, using the preview machine-learning model, indicating event occurrence probabilities for the preview set of entities.

9. The method as described in claim 1, further comprising:

receiving, by the computing device, a user input to persist the preview segment as an expanded segment;

receiving, by the computing device, an input scheduled to initiate training of an expanded machine-learning model;

generating, by the computing device, the expanded segment based on a segment definition from the preview segment persisted in storage responsive to the user input;

generating, by the computing device, expanded training data for an expanded set of the plurality of entities corresponding to the expanded segment;

training, by the computing device, an expanded machine-learning model utilizing the preview training data as part of machine learning to predict the event occurrence; and generating, by the computing device, search results using the expanded machine-learning model.

10. In a digital medium training environment, a system comprising:

a multi-mode selection module implemented by a processor to output a preview mode representation and an expanded mode representation;

a preview mode training module implemented by the processor to generate a preview segment responsive to selection of the preview mode representation, the preview mode training module including:

a sampling module to generate base training data by sampling corresponding usage data from a base set of entities, defined by a base segment, taken from a plurality of entities included in a data lake;

a search module to generate search results using a base machine-learning model trained using the base training data, the search results indicating event occurrence probabilities for the plurality of entities;

a user interface module to receive, via a user interface, a user input specifying an amount of reach or accuracy through interaction with a base accuracy/reach graph generated from the search results in real time; and a segment generation module to generate the preview segment based on the user input and the base segment; and an expanded mode training module configured to persist the preview segment as an expanded segment through scheduled training of an expanded machine-learning model responsive to selection of the expanded mode representation.

11. The system as described in claim 10, further comprising a model training module to train the base machine-learning model using the base training data.

12. The system as described in claim 10, further comprising a graph generation module to generate the base accuracy/reach graph from the search results.

13. The system as described in claim 10, wherein the expanded mode training module is configured to employ model results corresponding to a preview machine-learning model trained based on the preview segment and a segment definition corresponding to the preview segment to train the expanded machine-learning model.

14. The system as described in claim 10, wherein the entities are devices and further comprising a resource provisioning module configured to control operation of the devices.

15. The system as described in claim 10, further comprising a digital content access control module configured to control access to digital content based on respective probabilities of having the event occurrence as determined by a preview machine-learning model trained for the preview segment.

16. The system as described in claim 10, wherein the preview mode training module is configured to train the base machine-learning model in less than a threshold amount of time and the expanded mode training module is configured to train an expanded machine-learning model corresponding to the expanded segment in greater than the threshold amount of time.

17. The system as described in claim 16, wherein the threshold amount of time is ten seconds.

18. In a digital medium environment for search, a system comprising:
- means for receiving an input requesting generation of a preview segment from a base segment;
- means for displaying, in real time responsive to the input, a base accuracy/reach graph in a user interface, the displaying means including:
  - means for generating base training data by sampling corresponding usage data from a base set of entities, defined by the base segment, taken from a plurality of entities included in a data lake;
  - means for training a base machine-learning model using the base training data;
  - means for generating search results, using the base machine-learning model, indicating event occurrence probabilities for the plurality of entities; and
  - means for generating the base accuracy/reach graph from the search results;
- means for generating the preview segment based on a user input specifying an amount of reach or accuracy via the base accuracy/reach graph.

19. The system as described in claim 18, wherein:
- the event occurrence probabilities involve device operation; and
- the entities are devices, and further comprising means for controlling operation of the devices based on inclusion in the preview segment and respective probabilities of having the event occurrence as determined by a preview machine-learning model.

20. The system as described in claim 18, further comprising means for controlling access to digital content to the preview set of entities based on respective probabilities of having the event occurrence as determined by a preview machine-learning model.

* * * * *